United States Patent
Colin Espinoza et al.

(10) Patent No.: US 11,173,569 B2
(45) Date of Patent: Nov. 16, 2021

(54) LOCALIZED MATING SURFACE FOR LASER WELDING

(71) Applicant: FORD MOTOR COMPANY, Dearborn, MI (US)

(72) Inventors: Jose de Jesus Colin Espinoza, San Antonio la Isla (MX); Michael James Freeman, Allen Park, MI (US); Juergen Wilhelm Hover, Lohmar (DE); Guido H. Mueller, Cologne (DE); Mario Alberto Rubio Monroy, Mexico City (MX)

(73) Assignee: FORD MOTOR COMPANY, Dearborn, MI (US)

( * ) Notice: Subject to any disclaimer, the term of this patent is extended or adjusted under 35 U.S.C. 154(b) by 431 days.

(21) Appl. No.: 15/003,075

(22) Filed: Jan. 21, 2016

(65) Prior Publication Data

US 2017/0209962 A1  Jul. 27, 2017

(51) Int. Cl.
| | |
|---|---|
| *B23K 26/21* | (2014.01) |
| *B23K 33/00* | (2006.01) |
| *B23K 26/02* | (2014.01) |
| *B23K 26/60* | (2014.01) |

(52) U.S. Cl.
CPC .............. *B23K 26/21* (2015.10); *B23K 26/02* (2013.01); *B23K 26/60* (2015.10); *B23K 33/008* (2013.01)

(58) Field of Classification Search
CPC ......... B23K 9/04; B23K 9/048; B23K 31/025
USPC ........ 403/268, 271, 272; 428/594, 578, 582; 219/76.1, 104, 78.02
See application file for complete search history.

(56) References Cited

U.S. PATENT DOCUMENTS

| | | | |
|---|---|---|---|
| 4,738,560 A * | 4/1988 | Brussow .............. | B23K 33/008 |
| | | | 219/86.9 |
| 5,115,115 A | 5/1992 | Alborante | |
| 5,265,566 A | 11/1993 | Arnold et al. | |
| 5,519,184 A | 5/1996 | Umlas | |
| 7,115,324 B1 * | 10/2006 | Stol .......................... | B23K 9/02 |
| | | | 428/157 |
| 7,294,084 B2 | 11/2007 | Koehler et al. | |
| 8,267,475 B2 | 9/2012 | Houston et al. | |
| 2009/0179013 A1 | 7/2009 | Toeniskoetter | |

(Continued)

FOREIGN PATENT DOCUMENTS

| | | |
|---|---|---|
| CN | 101549439 A | 10/2009 |
| CN | 103934543 A | 7/2014 |

*Primary Examiner* — Tu B Hoang
*Assistant Examiner* — Thomas J Ward
(74) *Attorney, Agent, or Firm* — Brooks Kushman P.C.

(57) ABSTRACT

An assembly and method of forming the assembly are disclosed. The assembly may include first and second components, the first component including a non-mating region and a mating region. The mating region may have an offset in a direction towards the second component and have a welding surface contacting the second component. A weld located within the welding surface may join the first and second components. The weld may be a laser weld. The method may include positioning a first component including a welding pad offset from a surrounding region of the first component such that the welding pad is in contact with a second component to form a gap between the surrounding region of the first component and the second component. The first component may then be welded to the second component in an area within the welding pad.

18 Claims, 4 Drawing Sheets

(56) References Cited

U.S. PATENT DOCUMENTS

2009/0280349 A1\* 11/2009 Bittendorfer .......... B23K 26/26
 428/594
2015/0144605 A1\* 5/2015 Lin .................... B23K 26/1429
 219/121.64

\* cited by examiner

SECTION CUT A-A

LOCALIZED MATING SURFACE FOR LASER WELDING

TECHNICAL FIELD

The present disclosure relates to forming a localized mating surface, for example, in a component to be laser welded.

BACKGROUND

Laser welding, or laser beam welding (LBW), is a welding technique in which a laser is used to locally melt and fuse two or more components (e.g., pieces of metal). Lasers may provide a highly concentrated and controllable heat source, which may allow for fine weld lines and high welding rates, as well as high volume. Laser welding applications generally require tight mating conditions between the two substrates in order to achieve good quality. If any part of the mating components, outside of the welding area, varies dimensionally towards the other component, a gap may be created at the welding surface. This gap may adversely affect the quality of the weld by reducing the contact between the mating surfaces in the welding area.

SUMMARY

In at least one embodiment, an assembly is provided. The assembly may include first and second components; the first component includes a non-mating region and a mating region having an offset in a direction towards the second component and having a welding surface contacting the second component; and a weld joining the first and second components and located within the welding surface.

The non-mating surface may be spaced from the second component. In one embodiment, the welding surface has a rectangular shape. The offset may be at least 0.5 times a thickness of the first component. In one embodiment, the mating region is offset from the non-mating region around an entire perimeter of the mating region. In another embodiment, the mating region is formed on an edge of the first component. The first component may further comprise a plurality of mating regions, each offset from a non-mating region in a direction towards the second component, having a welding surface contacting the second component, and having a weld joining the first and second components located therein.

In one embodiment, the mating region has a long axis and the weld has a long axis and the long axis of the weld is arranged along a long axis of the mating region. The mating region may be rectangular and the long axis of the weld may be arranged along a diagonal of the mating region. In one embodiment, there is a single weld located within the mating region. The second component may further comprise a second mating region having an offset in a direction towards the first component and having a welding surface contacting the first component. A weld may join the first and second components and be located within the second mating region. In one embodiment, the first component is a tubular component. The mating region may be substantially parallel to the non-mating region and a transition region may extend between the mating region and the non-mating region.

In at least one embodiment, an assembly is provided. The assembly may include first and second components; the first component includes a non-mating region and a mating region having an offset in a direction towards the second component and having a welding surface contacting the second component; and a weld joining the first and second components, the weld located within the welding surface and comprising 10% to 50% of an area of the welding surface. In one embodiment, the welding surface has an area of 50 to 5,000 mm$^2$. The offset may be from 0.5 to 5 times a thickness of the first component. In one embodiment, the offset is from 0.5 to 10 mm.

In at least one embodiment, a method is provided. The method may include positioning a first component including a welding pad offset from a surrounding region of the first component such that the welding pad is in contact with a second component to form a gap between the surrounding region of the first component and the second component; and laser welding the first component to the second component in an area within the welding pad. In one embodiment, the method also includes clamping the first component to the second component at least in an area within the welding pad. In another embodiment, the welding step includes forming a weld having an area comprising 10% to 50% of an area of the welding pad.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described above, if any part of the mating components, outside of the welding area, varies dimensionally towards the other component in a laser welding process, a gap may be created at the welding surface. This gap may adversely affect the quality of the weld by reducing the contact between the mating surfaces in the welding area. This issue may need to be compensated for in order to achieve an adequate weld. For example, dies and forming tooling producing the mating components may need to be reworked to fine tune the mating surface until it is compliant and/or extensive improvements may need to be made on the welding/holding equipment to force the components into a proper mating condition.

These alternatives may both result in high investment costs and increased time during product development processes. In addition, with the increased use of advanced high-strength steels and press-hardened processes, there is even more difficulty producing repeatability given the coilto-coil or mill-to-mill variations that are seen even within a material that is approved to the same specification. If a commercial situation arises wherein it is necessary to re-source a material (e.g., steel, aluminum, etc.) from one mill (or supplier) to another mill (or supplier)—the "retuning" of the fabrication tooling (e.g., dies) can be very costly and time constrained. These same problems may also exist in the prototype phase, which is often even more constrained by time. In conventional processes, the ability to tune or adjust the mating surface locally does not exist without larger or more global tuning of surfaces.

Figure 1:
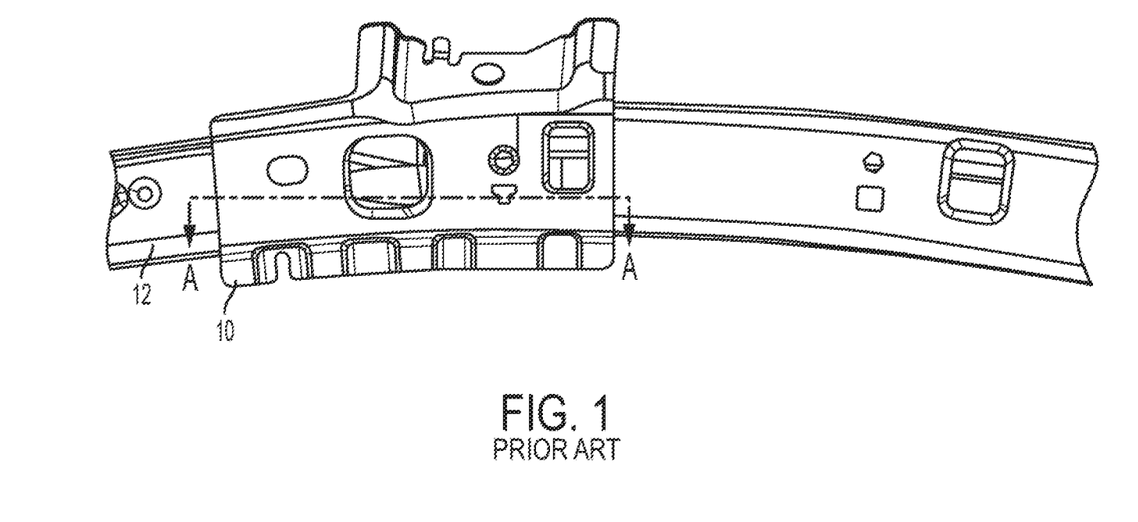
FIG. 1 is a top view of a conventional component assembly prior to laser welding.
Figure 2:
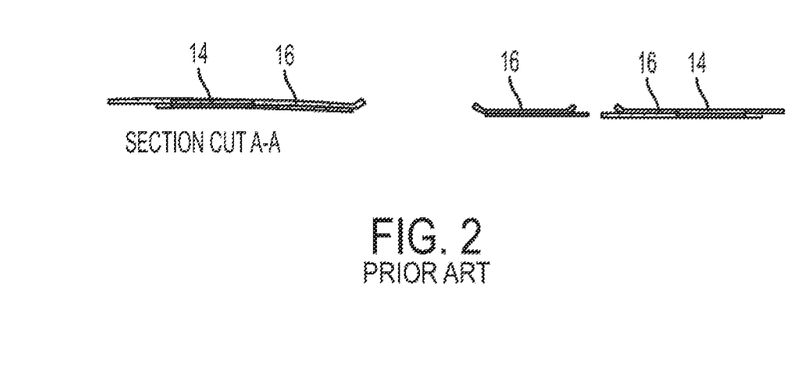
FIG. 2 is a cross-section of FIG. 1 through line A-A.

An example of a conventional laser welded assembly is shown in FIGS. 1 and 2 (PRIOR ART). FIG. 1 shows a first component 10 and a second component 12 that are to be laser welded. FIG. 2 is a cross-section through line A-A in FIG. 1 showing two weld mating areas 14, as well as several non-weld mating areas 16. In the example shown, the non-weld mating areas 16 of components 10 and 12 do not vary dimensionally toward the other, therefore, the weld mating areas 14 are in contact and may be successfully laser welded. However, if the non-weld mating areas 16 of either the first component 10 or the second component 12 did vary dimensionally toward the other, a gap would be formed in at least one of the weld mating areas 14. This may require the dies and forming tooling to be reworked to fine tune the mating surfaces until it they are compliant and/or the components may need to be forced into a proper mating condition. Either option may be costly in terms of capital and time.

With reference to FIGS. 3-6, component assemblies including at least one localized mating surface for laser welding are disclosed, as well as methods of forming the localized mating surface. The component assembly 20 may include a first component 22 and a second component 24 that are to be joined together. In one embodiment, the components 22 and 24 may be joined by welding, for example, laser welding. As described above, laser welding is a welding technique in which a laser may be used to locally melt and fuse two or more components (e.g., pieces of metal). Laser welding generally requires tight mating conditions between the two components in order to achieve good quality. Accordingly, if any part of the mating components 22 and 24 varies dimensionally towards the other component outside of the welding area, a gap may be created at the welding surface. This gap may adversely affect the quality of the weld by reducing the contact between the mating surfaces in the welding area.

Figure 3:
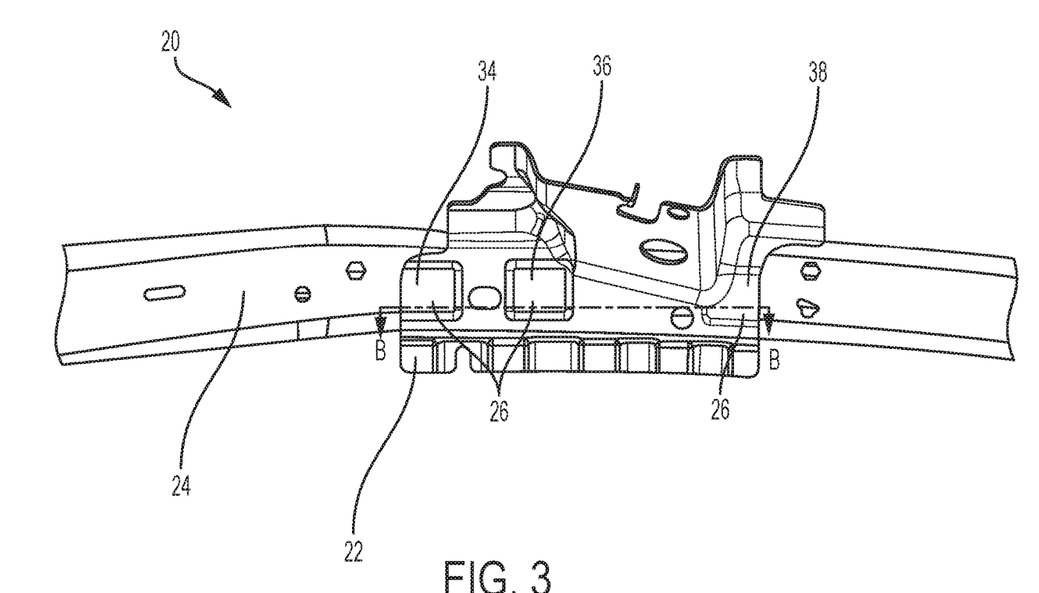
FIG. 3 is a top view of a component assembly prior to laser welding with one component including three welding pads, according to an embodiment.
Figure 4:
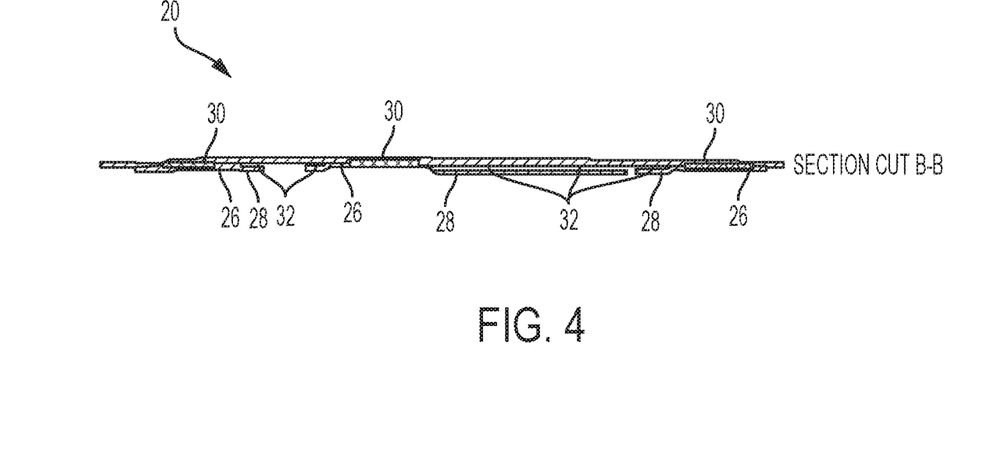
FIG. 4 is a cross-section of FIG. 3 through line B-B.

To reduce or eliminate gaps between the first component 22 and the second component 24 during a laser welding process, a laser welding pad or region 26 may be formed in one or both of the components 22 and 24. As shown in FIGS. 3 and 4, the first component 22 may have one or more pads or mating regions 26 formed therein. However, the second component 24 may also have one or more pads 26 formed therein or both components may have one or more pads 26 formed therein. The laser welding pads 26 may be offset from the non-weld areas or regions 28 in a direction towards the welding area 30 of the component to be joined. In the example shown in FIGS. 3 and 4, the welding pads 26 may be formed in the first component 22 and may be offset in a direction towards the welding areas 30 of the second component 24.

The offset of the pads 26 may form one or more gaps 32 between the first and second components when the pads 26 and the welding areas 30 are in a mating position. The non-weld or non-mating regions 28 of the first component 22 may be offset in a direction away from the second component 24 such that they are not in contact with the second component 24 to form the one or more gaps 32. The gaps 32 have a width that is the same or substantially the same as the size of the offset. In one embodiment, the pad or mating region 26 may be offset but parallel or substantially parallel to the non-mating areas 28 of the first component. There may be a transition region between the mating region 26 and the non-mating region 28 that is non-parallel (e.g., oblique) to both. Accordingly, the gap 32 may have a constant or substantially constant (e.g., ±10%) width along a majority (e.g., >50%) of its length. For example, the width of the gap 32 may be constant or substantially constant over at least 75%, 85%, or 95% of its length. In one embodiment, the width of the gap 32 may be constant or substantially constant over substantially the entire length (e.g., 99+%).

In at least one embodiment, the offset of the pad 26 may be a function of the component thickness (e.g., the first component 22). The offset may be at least 0.5 times (0.5×) the thickness of the component, such as at least 1×, 2×, 3×, 4×, or 5×. In one embodiment, the offset may be from 0.5 to 5 times (0.5× to 5×) the thickness of the component, or any sub-range therein. For example, the offset may be from 1× to 5×, 1× to 3×, 0.5× to 2×, or 1× to 2×. The thickness of the component may vary depending on the application, however, in at least one embodiment it may be from 0.5 to 5 mm. For example, the component may have a thickness of 0.5 to 2.5 mm or 0.5 to 1.5 mm. Accordingly, the offset may have any value calculated from the ranges above. For example, if the offset is from 0.5× to 5× of the thickness and the thickness is from 0.5 to 5 mm, then the offset may be from 0.25 mm to 25 mm. The same calculations may be performed for the other ranges disclosed above. In another embodiment, the offset of the pad 26 may be an absolute value. The offset may be at least 0.25 mm, 0.5 mm, 0.75 mm, or 1 mm. In one embodiment, the offset may be from 0.25 to 10 mm, or any sub-range therein, such as 0.5 to 10 mm, 0.7 to 10 mm, 1 to 10 mm, 1 to 7.5 mm, 1 to 5 mm, or 1 to 3 mm.

FIG. 4 shows a cross-section of FIG. 3 through the three laser welding pads 34, 36, and 38 across line B-B. Looking down on the cross-section shows the gaps 32 formed by the pads 26. In the embodiment shown, pad 34 is on a left-most edge of the first component 22 and pad 38 is on a right-most edge of the first component 22. Accordingly, there may be no gap on the left side of pad 34 or the right side of pad 38 between the components. However, there is a gap 32 formed to the right of pad 34 and the left of pad 38, as well as above and below both pads 34 and 36 (e.g., coming out of and going into the page, respectively, in FIG. 4). Pad 36 is located entirely within the first component 22 and therefore a gap 32 is formed around the entire perimeter of pad 36.

By forming the gap(s) 32 between the first and second components, there is a reduced risk that the non-weld areas of the components will cause a gap to be formed in the weld area. Even if one or both of the non-weld areas of the components varies dimensionally toward the other (e.g., unintentionally, due to a shaping error, out of tolerance component, etc.), the gap(s) 32 may form a buffer between the two components such that the welding areas are not affected or are less affected. For example, if the non-weld area 28 to the right of pad 34 formed such that it extends towards the second component 24 more than intended, the gap 32 may prevent the non-weld area 28 from contacting a non-weld area 28 of the second component 24. Therefore, the mating of the pad 26 and the welding area 30 may not be compromised (or to a lesser extend). Similarly, if a non-weld area 28 of the second component 24 extended towards a non-weld area 28 of the first component 22, the same effect would be achieved.

Figure 5:
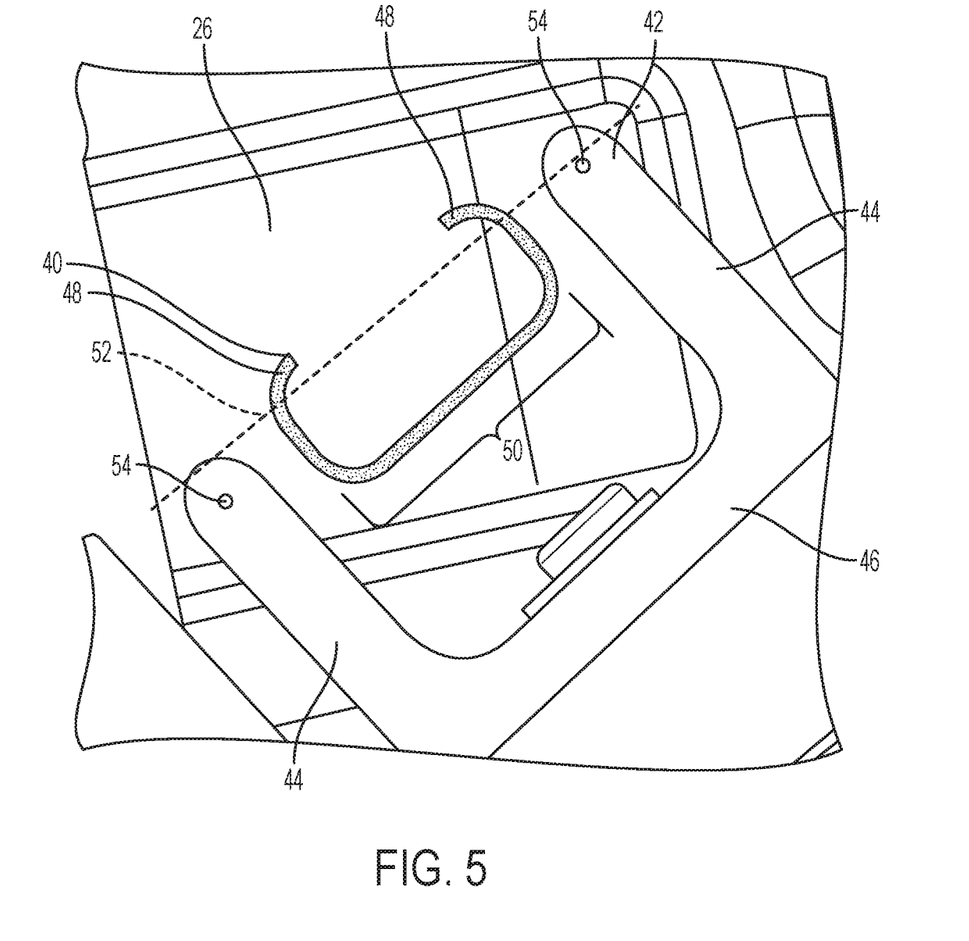
FIG. 5 is a top view of a weld and a clamp inside a welding pad, according to an embodiment.
Figure 6:
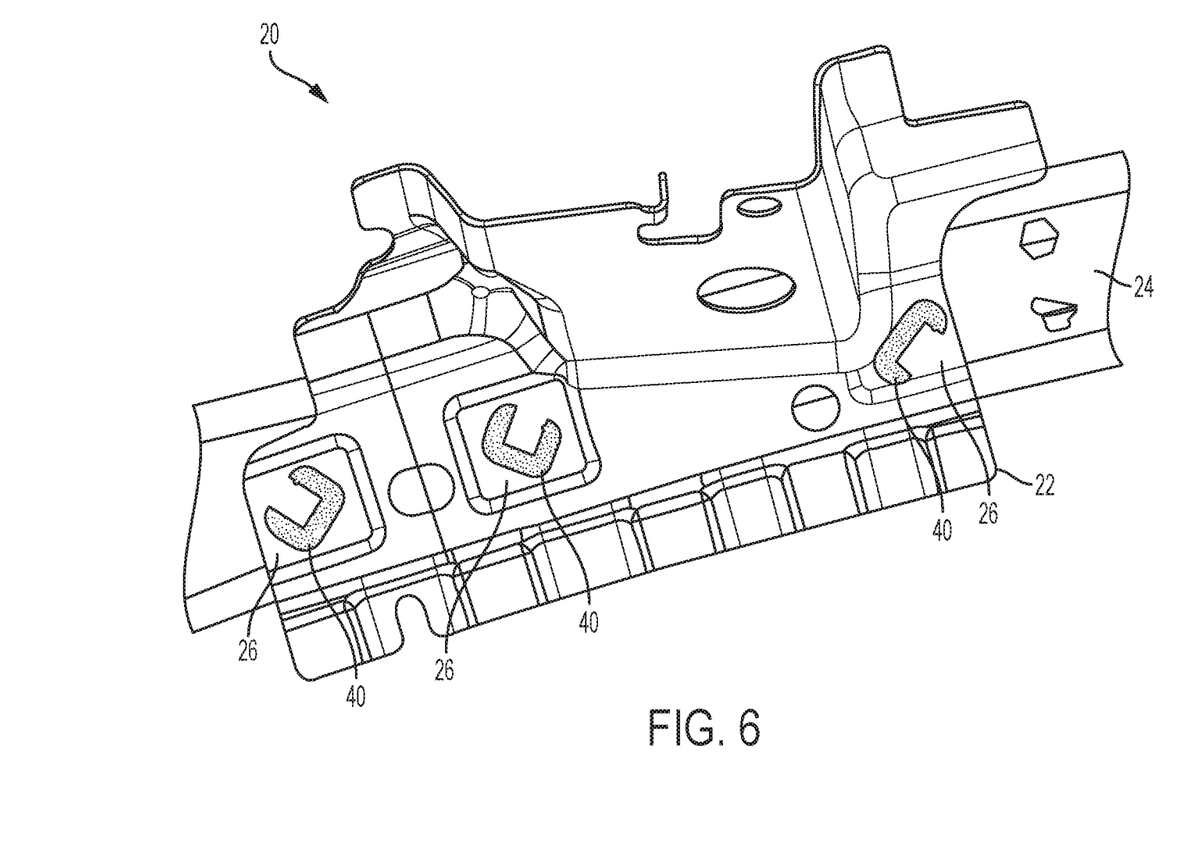
FIG. 6 is a top view of a laser welded component assembly with one component including three welding pads, according to an embodiment.

While the welding surface of the pads 26 are shown in FIGS. 3, 5, and 6 as square or rectangular in shape (e.g., in top, plan view), they may have any suitable shape, such as oval, circle, ellipse, triangle, pentagon, hexagon, other polygons, or irregular shapes. The corners of the pads 26 may be rounded, as shown, without being considered a different shape. The shape and size of the pads 26 may depend on the shape and size of the weld. The pads 26 may have any suitable size for accommodating the weld 40. In one embodiment, the welding surface of the pads 26 may have an area of 25 to 10,000 mm$^2$, or any sub-range therein. For example, the pads 26 may have an area of 25 to 5,000 mm$^2$, 50 to 5,000 mm$^2$, 50 to 3,000 mm$^2$, 50 to 2,500 mm$^2$, 100 to 2,500 mm$^2$, 100 to 1,500 mm$^2$, or 100 to 1,000 mm$^2$.

With reference to FIG. 5, the welding surface of the pads 26 may be sized such that they are just large enough to accommodate the weld 40 itself and a clamp 42, without significant extra space. The weld 40 may have any suitable size and shape. As shown in the non-limiting examples of FIGS. 5 and 6, the weld 40 may have a "U" shape having three sides. For example there may be two parallel portions 44 connected by a transverse portion 46. The parallel portions 44 may connect to the transverse portion 46 perpendicularly. In the embodiment shown in FIG. 5, the unconnected ends 48 of the parallel portions may curl or bend towards each other. The weld 40 may form at least a certain portion of the area of the welding surface of the pad 26. In one embodiment, the area of the weld 40 may be at least 10% of the area of the welding surface of the pad 26, for example, at least 15%, 20%, 25%, 30%, or 35%. The area of the weld 40 may form from 10% to 75% of the area of the welding surface of the pad 26, or any sub-range therein, such as 10% to 50%, 20% to 60%, 20% to 50%, or others. The absolute value of the area of the weld 40 may depend on the application. However, in at least one embodiment, the area of the weld 40 may be from 5 to 1,000 mm$^2$, or any sub-range therein, such as 10 to 1,000 mm$^2$, 10 to 500 mm$^2$, 10 to 250 mm$^2$, or 5 to 100 mm$^2$.

The weld 40 may be arranged within the pad 26 so as to minimize or substantially minimize the size of the pad 26 necessary to accommodate the weld 40 and the clamp 42. For example, a long axis or dimension 50 of the weld 40 may be arranged along a long axis or dimension 52 of the pad 26 (e.g., on or parallel to the long axis of the pad). As shown in FIG. 5, the long axis 50 of the weld 40 is arranged along the diagonal of the rectangular pad 26. The first and second components 22 and 24 may be clamped together in order to facilitate contact of the welding areas 30 of each component. A clamp 42 may contact at least one of the two components inside a pad 26 for each weld 40. The clamp 42 may have one or more contact points 54 with the pad 26. As shown in FIG. 5, the clamp 42 may contact the pad 26 at two contact points 54. The clamp may contact the pad 26 on opposite sides of the weld 40. In the example shown in FIG. 5, there are contact points 54 on opposite sides of the long axis 50 of the weld 40. Accordingly, in this example, the contact points are also disposed on the long axis 52 of the pad.

The contact points 54 of the clamp 42 may be spaced from the weld 40 and from an edge of the pad 26 by a minimum amount. The minimum spacing may prevent the clamping force from affecting the area to be welded and to avoid the laser from contacting or affecting the clamp 42. The minimum spacing from the edge of the pad 26 may prevent the clamping force from distorting the offset of the pad 26. For example, the spacing from the edge of the pad 26 to the contact point(s) 54 of the clamp 42 may be from 1 to 100 mm, or any sub-range therein, such as 4 to 100 mm, 4 to 75 mm, or 4 to 50 mm.

With reference to FIG. 6, a welded assembly 20 is shown having a first component 22 laser welded to a second component 24. In the embodiment shown, the first component includes three laser welding pads 26. In this embodiment, each welding pad 26 has one weld 40 disposed therein. As shown, each weld 40 may be completely within the welding pad 26. While one weld 40 is shown in each welding pad 26, in other embodiments at least one welding pad 26 may have two or more welds disposed therein. In addition, while three pads 26 are shown, there may be one or more pads 26, for example, 1, 2, 3, 4, 5, or more. As disclosed above, the pads 26 may be formed in the first component 22 and/or the second component 24.

In at least one embodiment, the first and second components may be vehicle components. However, the disclosed welding pads may be implemented in any welded assembly application. In the examples shown, the first component 22 is a stamped body panel and the second component 24 is a tubular reinforcement. However, other components may be included in the assembly 20, such as body components, structural or non-structural. In one embodiment, the component including the pad(s) 26 may be a sheet or a tube. As used herein, a tube may be an elongated hollow object, not necessarily cylindrical or having a uniform cross-section along its length. The components may be made of any weldable (e.g., laser weldable) material, such as steel. For example, the components may be made from any combination of cold-rolled steel, high strength steel, martensitic steel, boron steel, or others. The components, including those with pads 26 formed therein, may be formed from any suitable process. Non-limiting examples of suitable processes may include stamping and die forming (e.g., hydroforming, hot metal gas forming, etc.).

In addition to providing increased robustness in the component assembly prior to and during welding, the welding pads may also have benefits in the forming and/or adjusting of the tooling that forms the components. In conventional component assemblies, such as those described and shown in FIGS. 1 and 2, the component mating surfaces extend well beyond the welding area. As described, discrepancies in the mating surfaces in areas outside of the welding areas may therefore create gaps in the welding surface. Accordingly, in order to compensate for these gaps, some action must be taken, generally one of two options.

First, the dies and/or tooling that form the components may have to be reworked or refined to address the variance in one or both components that are causing the gap. This may be a very difficult and time-consuming process, which may take several iterations. The adjustments to the tools/dies (e.g., re-machining) may be global, not localized to the area of the weld(s). These issues may be exacerbated by the increased use of advanced high-strength steels, high-strength aluminum, or other advanced materials. For example, the materials may have undergone press-hardening processes that make it more difficult to have a high degree of repeatability in the materials (e.g., coil-to-coil variations). In addition, there may be mill-to-mill variations if components are sourced from multiple locations, even if the specifications are the same. Therefore, reworking of the tools/dies to accommodate the various sources of variations may be costly in both time and resources.

A second option may be to adjust or rework the welding or holding/clamping equipment in order to force the components into the proper mating condition. Similar to reworking the tools/dies, this is a time-consuming and difficult process, since some adjustments may not provide a solution for all variances. In addition, increasing the clamping force may be infeasible or damaging to the components in some assemblies. For example, an increase in clamping force may cause other quality control issues in the components, such as making one or both components out of the nominal design/specification shape. Accordingly, neither option may be practical or efficient to remedy the issue of improper mating surfaces.

The disclosed welding pads may reduce or eliminate the issue of non-weld areas forming gaps in the weld area mating surfaces. As disclosed above, the gaps provided between the non-welding areas of the components may provide a buffer such that minor variations in either component do not cause the weld area mating surface to be compromised. In addition, in the event that adjustments do need to be made to the mating surfaces of the welding pads, the location of the area to be adjusted is known and localized to the welding pads. Therefore, adjustments to the welding pads may be relatively minor and may be done quickly.

In one embodiment, the tooling and die tolerances of the welding pads may be tighter than the tolerances of the non-welding areas. The welding pads may be formed by cutting inserts into the tools/dies. Therefore, if there is an issue with the mating surface in the welding area, the insert may be reworked or re-machined in order to address the issue. The non-welding areas of the tools/dies may be unchanged. Accordingly, the inserts can be adjusted or reworked with significantly reduced machining time/quantity, tryout, press-time, and labor time. In addition, as the tool/die wears over time, the inserts may be reworked or refreshed to maintain acceptable welding mating surfaces. By only having to adjust the localized welding pad areas of the tools/dies, the re-tooling may be faster and less expensive.

In one embodiment, the inserts may be removable and replaceable within the tools/dies. Accordingly, if an insert is to be reworked or replaced, it can be removed from the remainder of the tool/die, making the work easier and more accessible. The inserts may be formed of the same material as the tool/die or it may be different. In one embodiment, the inserts may be formed of a higher quality material than the overall tool/die. Higher quality may mean stronger, more wear resistant, having tighter dimensional tolerances, easier to rework or re-machine, or other properties that are beneficial for tool/die materials.

In addition to improving the forming and/or reworking of the tools/dies, the welding pads may also provide benefits for the welding fixtures. As described above, if the welding mating surfaces are not properly aligned, the welding fixture may include clamps that force the welding mating surfaces into qualification or compliance. If clamping is needed with the disclosed welding pads, the weld area to be brought into compliance may be much smaller compared to assemblies where variations in the non-welding areas remote from the weld area are causing the non-compliant weld mating surfaces. Accordingly, reduced clamping force and/or clamping equipment may be needed when welding components having the disclosed welding pads.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An assembly comprising:
    a first tubular component;
    a second component;
    the first component includes non-mating and mating regions, the mating region offset from the non-mating region in a direction towards the second component to form a lateral surface transition region around the entire perimeter of the mating region and extending between the mating region and the non-mating region, the mating region having a welding surface contacting the second component, the lateral surface transition region and the second component forming a first gap therebetween, the non-mating region and the second component forming a second gap therebetween, the first gap extending a shorter distance than the second gap; and
    a weld joining the first and second components and located within the welding surface.

2. The assembly of claim 1, wherein the lateral surface transition region is oblique to the mating region and non-mating region.

3. The assembly of claim 1, wherein the welding surface has a rectangular shape.

4. The assembly of claim 1, wherein the offset is at least 0.5 times a thickness of the first component.

5. The assembly of claim 1, wherein the first component further comprises a plurality of mating regions, each offset from a non-mating region in a direction towards the second component, having a welding surface contacting the second component, and having a weld joining the first and second components located therein.

6. The assembly of claim 1, wherein the mating region has a long axis and the weld has a long axis and the long axis of the weld is arranged along a long axis of the mating region.

7. The assembly of claim 6, wherein the mating region is rectangular and the long axis of the weld is arranged along a diagonal of the mating region.

8. The assembly of claim 1, wherein the mating region is formed on an edge of the first component.

9. The assembly of claim 1, wherein there is a single weld located within the mating region.

10. The assembly of claim 1, wherein the second component further comprises a second mating region having an offset in a direction towards the first component and having a welding surface contacting the first component; and a weld joining the first and second components located within the second mating region.

11. An assembly comprising:
    first and second components;
    the first component includes non-mating and mating regions, the mating region offset from the non-mating region in a direction towards the second component to form a lateral surface transition region around the entire perimeter of the mating region and extending between the mating region and non-mating region, the mating region having a welding surface contacting the second component, the lateral surface transition region and the second component forming a first gap therebetween, the non-mating region and the second component forming a second gap therebetween, the first gap extending a shorter distance than the second gap; and
    a weld joining the first and second components, the weld located within the welding surface and comprising 10% to 50% of an area of the welding surface.

12. The assembly of claim 11, wherein the lateral surface transition region is oblique to the mating region and the non-mating region.

13. The assembly of claim 11, wherein the offset is from 0.5 to 5 times a thickness of the first component.

14. The assembly of claim 11, wherein the offset is from 0.5 to 10 mm.

15. An assembly comprising:
    first and second components;
    the first component includes a non-mating region and first and second discontinuous mating regions, each mating region offset from the non-mating region in a direction towards the second component to form a lateral surface transition region around the entire perimeter of each mating region and extending between the mating region and the non-mating region, the mating region having a welding surface contacting the second component, the lateral surface transition region and second component forming a first gap therebetween, the non-mating region and the second component forming a second gap therebetween, the first gap extending a shorter distance than the second gap; and
    a weld joining the first and second components and located within the welding surfaces.

16. The assembly of claim 15, wherein the first component is a tubular component.

17. The assembly of claim 15, wherein each offset is from 0.5 to 5 times a thickness of the first component.

18. The assembly of claim 15, wherein each offset is from 0.5 to 10 mm.

* * * * *